United States Patent Office 3,733,288
Patented May 15, 1973

3,733,288
ALKALINE EARTH METAL PHENOXIDE ESTERS AND POLYVINYL CHLORIDE RESIN COMPOSITIONS CONTAINING THE SAME AS STABILIZERS
Motonobu Minagawa, Koshigaya, Tetsuo Sekiguchi, Hasuda-machi, and Naohiro Kubota, Tokyo, Japan, assignors to Argus Chemical Corporation, Brooklyn, N.Y.
No Drawing. Filed July 30, 1970, Ser. No. 59,670
Claims priority, application Japan, Aug. 23, 1969, 44/66,770
Int. Cl. C08f 45/32, 45/62
U.S. Cl. 260—23 XA                    21 Claims

ABSTRACT OF THE DISCLOSURE

Alkaline earth metal phenoxide esters are prepared having the following formula:

(I)                     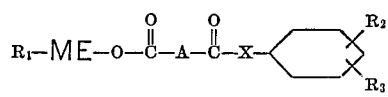

wherein $R_1$ is an organic radical linked to the alkaline earth metal atom ME through oxygen or sulfur, or a carboxylic or thiocarboxylic acid group, A is a bivalent linking group, X is oxygen or sulfur, and $R_2$ and $R_3$ are organic radicals or hydrogen.

Polyvinyl chloride resin compositions having improved resistance to weathering, and a reduced tendency to plate out, and to develop bloom, are also provided, containing these compounds as stabilizers, alone or with other polyvinyl chloride resin stabilizers.

---

The alkaline earth metal phenolates, particularly those containing alkyl substituents, are together with the organotin compounds among the most important polyvinyl chloride resin heat stabilizers in commercial use today. Stabilizer compositions based on alkaline earth metal alkyl phenolates, organic phosphites and polyvalent metal salts of organic carboxylic acids have been in wide use since U.S. Pat. No. 2,716,092 and its foreign counterparts issued. H. Verity-Smith in his article entitled, "Production of Vinyl Stabilizers in Europe," published in British Plastics, September 1962, pages 466–469, commented that the development of these stabilizers was the most important single development in polyvinyl chloride resin stabilization in many years, and this characterization continues to be true.

These compositions give excellent heat stability and excellent clarity, but under some circumstances plate-out is not all that could be desired, and blooming may take place. Moreover, weathering resistance may also be inferior to the organotin stabilizers, which are therefore preferred to the alkaline earth metal phenolate stabilizers under such circumstances, since they do not display these problems.

In accordance with the invention, alkaline earth metal phenolate esters are provided which are superior to the usual alkaline earth metal alkyl phenolates in resistance to the development of bloom, to plateout, and to weathering, and have better initial clarity. These stabilizers have the formula:

(I)                     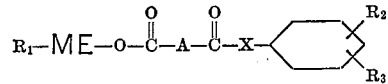

wherein $R_1$ is an organic radical, ME is an alkaline earth metal atom, A is a bivalent linking radical, X is oxygen or sulfur and $R_2$ and $R_3$ are organic radicals or hydrogen. The $R_1$ radical is linked to the metal atom ME through oxygen or sulfur, or a carboxylic or thiocarboxylic acid group.

These compounds can be used with other polyvinyl chloride resin heat and light stabilizers, and in some cases display a synergized stabilizing effectiveness in these combinations.

Polyvinyl chloride resin compositions accordingly are provided, in accordance with the invention, containing these stabilizers alone or with other polyvinyl chloride resin stabilizers, and display improved resistance to weathering, and a reduced tendency to plate out, and to develop bloom, as well as excellent heat stability and initial color and clarity.

The $R_1$ radical is of the form R—Y, in which Y is sulfur, oxygen, a carboxylic acid group, or a thiocarboxylic acid group, and R is an organic group.

One preferred class of R groups are hydrocarbon groups having from one to about thirty carbon atoms. The hydrocarbon group can be saturated or unsaturated aliphatic or cycloaliphatic, or aromatic. It can, for example, be an alkyl group, an alkenyl group, an aryl group, a cycloalkyl group, or a cycloalkenyl group. Exemplary are methyl, ethyl, propyl, isopropyl, butyl, isobutyl, tertiary butyl, secondary butyl, amyl, isoamyl, hexyl, isohexyl, heptyl, octyl, 2-ethylhexyl, nonyl, decyl, dodecyl, stearyl, myristyl, palmityl, propenyl, hexenyl, octenyl, decenyl, oleyl, ricinoleyl, linoleyl, and linolenyl, α- and β-phenethyl, phenyl, phenethyl, tolyl, xylyl, ethylbenzyl, ethylphenyl, diethylphenyl, naphthyl, hexenyl, butenyl, propenyl, propynyl, hexynyl, nonynyl, and decynyl.

When Y is sulfur, these will be recognized as thiophenyl, thioalkyl or thiocycloalkyl groups, or the thio carboxylic acids.

R—Y— can also take the form of another

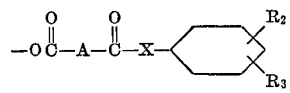

group.

A is a bivalent linking group, which can be straight chain or branched, and is a hydrocarbon group of the aliphatic, aromatic, or cycloaliphatic type, containing, optionally, additional carboxylic acid groups. A has from two to about twelve carbon atoms, and can, for example, be ethylene, propylene, butylene, 1-methyl propylene, 1,2-dimethylethylene, pentylene, hexylene, heptylene, octylene, decylene, 1-phenyl-ethylene, ethylphenyl-methylene, 1-hexyl ethylene, 1-methyl-propylene, 2-methyl-propylene, as well as unsaturated hydrocarbon groups such as

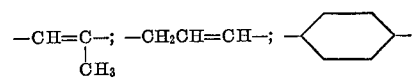

1 - carboxy phenylene, 4,5 - dicarboxy phenylene, cyclohexylene, cyclopentylene, cycloheptylene and cyclooctylene.

$R_2$ and $R_3$ are hydrocarbon groups of the form of R, and they can also be hydrogen; halogen, such as chlorine, fluorine, bromine and iodine; nitro, nitroso alkoxy having from one to about twelve carbon atoms, such as methoxy, ethoxy, propoxy, butoxy, pentoxy, hexoxy, heptoxy, octoxy, nonoxy and decoxy; aryloxy having from six to about thirty carbon atoms, such as phenoxy, methyl phenoxy, ethyl phenoxy, and propyl phenoxy; thioalkyl or thioaryl groups of the same type as the alkoxy and aryloxy groups; carboxylic acid or amide groups, or etherified carboxylic acid ester groups, in which the esterifying groups can be of the form of R as above; as well as esterified hydroxy groups

in which R″ is of the same form of R as above.

These compounds are prepared by reaction of the corresponding alkaline earth metal phenate or thiophenate with the dibasic organic acid anhydride forming the desired ester, in accordance with the following scheme:

(II)
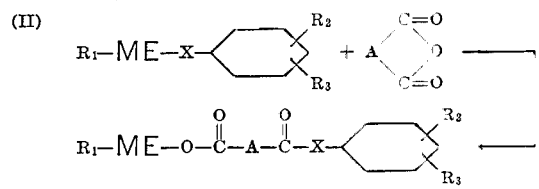

In the preferred case, the starting metal phenate is an alkaline earth metal diphenate, and when two moles of the anhydride are used, per mole of the metal diphenate, the reaction proceeds as follows:

(III)
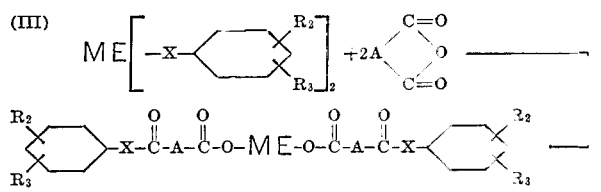

In the above equations $R_1$, $R_2$, $R_3$, X and A have the same meaning as set forth above.

The esterification reaction proceeds in solution in a suitable inert organic solvent, such as an aromatic or aliphatic hydrocarbon; if one or both of the reactants are liquid at the reaction temperature, a solvent is unnecessary. Temperatures within the range from about 40 to about 150° C. are satisfactory. A suitable temperature is the reflux temperature of the solvent. The reaction is complete in a few hours time, and the product readily isolated by distilling off the solvent, preferably under reduced pressure. It is not necessary to separate the reaction products from the starting material, since the reaction proceeds quantitatively if stoichiometric proportions are used initially, and in any event, unreacted starting materials are not deleterious to the stabilizer compositions.

Consequently, although stoichiometric proportions of the reactants can be reacted, it is also possible to use a moderate excess of either reactant. It is in fact advantageous in many cases to use a moderate excess of the metal phenate.

It has also been determined that a mixture of the anhydride and metal phenate can be added to a polyvinyl chloride resin, and behaves as a heat stabilizer in the same manner as if a reaction product has been added. Evidently, esterification takes place during processing or blending of the mixture with the resin. Such mixtures are therefore referred to herein as phenolate ester precursor mixtures.

It is also possible to blend the anhydride and metal phenate with other heat stabilizers. The esterification can be carried out in their presence, optionally with a solvent for the mixture, or in processing or blending with the resin.

Exemplary organic acid anhydrides that can be used include maleic anhydride, succinic anhydride, glutaric anhydride, adipic anhydride, methyl succinic anhydride, 1-phenyl-ethyl succinic anhydride, benzyl succinic anhydride, n-hexyl succinic anhydride, dimethyl succinic anhydride, methyl glutaric anhydride, itaconic anhydride, citraconic anhydride, cis-glutaconic anhydride, phthalic anhydride, trimellitic anhydride and pyromellitic anhydride.

Illustrative alkaline earth metals are calcium, barium, strontium, and magnesium, and these are used in the form of their mono or di-phenates or thiophenates, as indicated above. The hydrocarbon-substituted phenates are preferred, and the alkyl phenates are especially preferred.

The phenol and thiophenol compounds from which the metal phenates are derived have the structure:

wherein $R_2$ and $R_3$ are as noted above.

Representative thiophenols include thiophenol, methyl thiophenol, ethyl thiophenol, diethyl thiophenol, dimethyl thiophenol, tetrahydro-α-thiophenol, β-thiophenol, and nonyl thiophenol.

Representative phenols include phenol, guaiacol, resorcinol mono-acetate, vanillin, butyl salicylate, 2,6-di-tert-butyl-4-methyl phenol, 2-tert-butyl-4-methoxyphenol, 2,4-dinonyl phenol, 2,3,4,5-tetradecyl phenol, tetrahydro-γ-naphthol, ortho, meta and paracresol, ortho, meta and para-phenylphenol, ortho, meta and para-xylenols, the carvenols, symmetrical xylenol, thymol, ortho, meta and para-nonylphenol, ortho, meta and para-dodecyl phenol, and ortho, meta and para-octyl phenol, o- and m-tert butyl-p-cresol, p-n-decyloxy phenol, p-n-decyloxy cresol, nonyl n-decyloxy cresol, eugenol, isoeugenol, glyceryl monosalicylate, methyl-p-hydroxybenzoate, ethyl-p-hydroxy cinnamate, 4-benzyloxyphenol, o- and p-cyclohexylphenol, methyl benzyl phenol, and bis(methyl benzyl) phenol.

The following examples in the opinion of the inventors represent preferred embodiments of the invention.

EXAMPLE 1

A mixture of 18.8 g. (0.2 mol) of phenol, 31.5 g. (0.1 mol) of barium hydroxide octahydrate and 200 g. of xylene were reacted at the reflux temperature of xylene for two hours, thereby forming barium di(phenate), as shown by the separation in the water trap of the theoretical amount of water released in the course of the reaction, 18 g. The reaction mixture was then cooled to 50° C., and 19.6 g. (0.2 mol) of maleic anhydride was added. The resulting mixture was reacted at 80° C. for one hour, filtered, and the solvent removed under vacuum. A yellowish powdered product was produced. The barium content analyzed at 28.75% (theoretical 28.41%). The formula of the product shown by this analysis was:

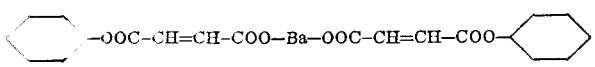

EXAMPLE 2

A mixture of 88 g. (0.4 mol) of nonyl phenol, 63 g. (0.2 mol) of Ba(OH)$_2$·8H$_2$O and 200 g. of xylene were reacted at the reflux temperature of xylene until the theoretical amount of water released by the reaction had been produced (36 g.), thereby forming barium di(nonyl phenate). The reaction mixture was cooled to 50° C. There was then added 39.2 g. (0.4 mol) of the maleic anhydride, and the mixture was heated at 80° C. for one hour, filtered and the solvent removed under vacuum. A brown highly viscous liquid material was obtained, having a barium content by analysis of 18.82% (theoretical 18.61%) and corresponding to the formula:

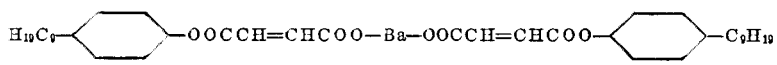

EXAMPLE 3

A mixture of 30.2 g. (0.2 mol) of para-tertiary butyl phenol, 31.5 g. (0.1 mol) of Ba(OH)$_2$·8H$_2$O and 300 g. of xylene were reacted at the reflux temperature of xylene until the theoretical amount of water had been produced (18 g.). The reaction mixture was then cooled to 50° C., and 19.6 g. (0.2 mol) of maleic anhydride was added. The mixture was then heated at 80° C. for one hour, filtered, and the solvent removed under vacuum. A yellowish powdered material was obtained having a barium content by analysis of 21.7% (theoretical 21.8%), coresponding to the formula:

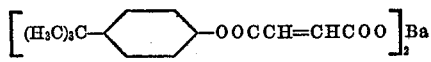

EXAMPLE 4

A mixture of 54.7 g. (0.1 mol) of barium di(p-octyl phenate), 19.6 g. (0.2 mol) of maleic anhydride and 200 g. of xylene were heated at 80° C. for one hour. The reaction mixture was then filtered, and the solvent removed under vacuum. A yellowish highly viscous liquid was obtained, having a barium content by analysis of 19.0% (theoretical 19.43%) and corresponding to the formula:

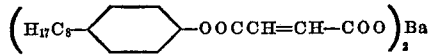

EXAMPLE 5

A mixture of 44 g. (0.2 mol) of nonyl phenol, 31.5 g. (0.1 mol) of Ba(OH)$_2$·8H$_2$O and 200 grams of xylene were heated at the reflux temperature of xylene while the water which separated was recovered in a water trap. After the theoretical amount of water had been obtained (18 g.) the reaction mixture was cooled to about 50° C. There was then added 29.6 g. (0.2 mol) of phthalic anhydride, and the mixture heated at 80° C. for one hour. The reaction mixture was then cooled, filtered, and the solvent removed under vacuum. A yellowish brown highly viscous liquid material was obtained having a barium content of 15.73% (theoretical 15.77%) and corresponding to the formula:

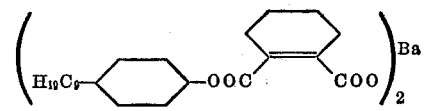

EXAMPLE 6

A mixture of 57.5 g. (0.1 mol) of barium di(nonyl phenate), 20.0 g. (0.2 mol) of succinic anhydride and 200 g. of xylene were heated at 80° C. for one hour. The reaction mixture was then filtered, and the solvent removed under vacuum. A brown highly viscous liquid material was produced, having a barium content of 18.32% (theoretical 18.59%) corresponding to the formula:

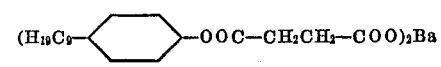

EXAMPLE 7

A mixture of 57.5 g. (0.1 mol) of barium di(nonyl-phenate), 14.8 g. (0.1 mol) of phthalic anhydride, 9.8 g. (0.1 mol) of maleic anhydride and 200 g. of xylene were heated at 80° C. for one hour. The reaction mixture was then filtered, and the solvent removed under vacuum. A yellowish brown highly viscous liquid material was obtained, having a barium content of 16.98% (theoretical 17.09%) corresponding to the formula

EXAMPLE 8

A mixture of 57.5 g. (0.1 mol) of barium di(nonyl phenate), 40.8 g. (0.2 mol) of p-xylyl-succinic anhydride and 200 grams of xylene was heated at 80° C. for one hour. The reaction mixture was filtered, and the solvent separated under vacuum. A yellowish brown high viscosity liquid material was obtained, having a barium content of 13.88% (theoretical 13.96%) corresponding to the formula:

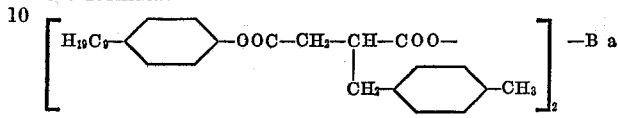

EXAMPLE 9

A mixture of 19.6 g. (0.1 mol) of magnesium diphenate, 19.6 g. (0.2 mol) of maleic anhydride and 150 g. of hexane were reacted at the reflux temperature of hexane for one hour. The solvent was then removed under reduced pressure, and a greyish white powdered material was obtained, having a magnesium content of 6.12% (theoretical 5.98%), corresponding to the formula:

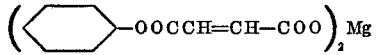

EXAMPLE 10

A mixture of 22.6 g. (0.1 mol) of calcium diphenate, 19.6 g. (0.2 mol) of maleic anhydride and 100 g. hexane were reacted under reflux for one hour. The reaction mixture was cooled, and the solvent separated under vacuum. A greyish white powdered material was obtained, having a calcium content of 10.2% (theoretical 9.5%) corresponding to the formula:

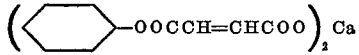

EXAMPLE 11

A mixture of 44.6 g. (0.204 mol) of nonyl phenol, 31.5 g. (0.1 mol) of Ba(OH)$_2$·8H$_2$O and 100 grams of xylene were heated under reflux until the theoretical amount of water had been separated in a water trap. The reaction was continued for 30 minutes. Then, the reaction mixture was cooled to 50° C., and 9.8 g. (0.1 mol) of maleic anhydride added. The resulting mixture was heated at 80° C. for one hour, and the xylene separated under vacuum. A brown high viscosity liquid material was obtained, having a barium content of 20.8% (theoretical 20.4%), corresponding to the formula:

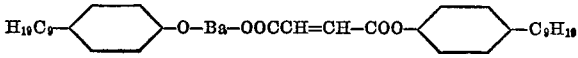

EXAMPLE 12

44.6 g. (0.204 mol) of nonyl phenol, 31.5 g. (0.1 mol) of Ba(OH)$_2$·8H$_2$O and 100 grams of xylene were refluxed until the theoretical amount of water had been recovered in a water trap. The reaction was then continued from an additional 30 minutes, after which the mixture was cooled to 50° C., and 14.8 g. (0.1 mol) of phthalic anhydride added. The resulting mixture was heated at 80° C. for one hour, and the xylene then separated under vacuum. A brown high viscosity liquid material was obtained, having a barium content of 18.7% (theoretical 19.0%) and corresponding to the formula:

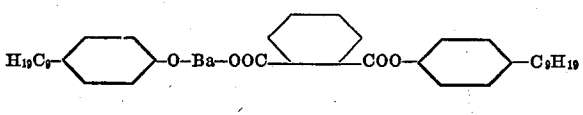

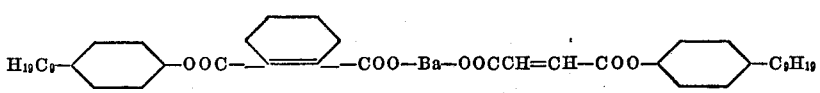

EXAMPLE 13

A mixture of 27.4 g. (0.1 mol) of strontium phenoxide, 19.6 g. (0.2 mol) of maleic anhydride and 100 g. of benzene were heated at 80° C. for one hour. The benzene was then separated by vacuum distillation, and a greyish white powdered material obtained, having a strontium content of 18.81% (theoretical 18.68%), corresponding to the formula:

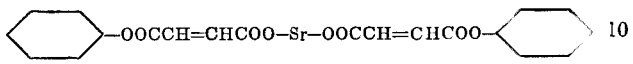

EXAMPLE 14

A mixture of 88 g. (0.4 mol) of nonylphenol, 63 g. (0.2 mol) of $Ba(OH)_2 \cdot 8H_2O$ 14 g. bis-2-butoxy ethyl ether and 70 g. aromatic naphtha (B.P. 150–190° C.) were reacted under reflux with a water trap. After the theoretical amount of water had been separated (36 g.), the reaction mixture was cooled to 50° C. There was then added 19.6 g. (0.2 mol) of maleic anhydride, and the reaction mixture then heated at 80° C. for one hour, and filtered. A brown mobile liquid material was obtained, having a barium content of 12.3% (theoretical 12.5%), corresponding to a solution of the compound having the formula:

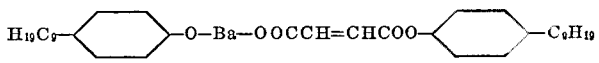

EXAMPLE 15

A mixture of 57.5 g. (0.1 mol) of barium di(nonylphenate), 20.4 g. (0.1 mol) of ethylbenzene succinic anhydride and 200 grams of xylene were heated at 80° C. for one hour. The mixture was filtered, and the xylene separated by vacuum distillation. A yellow brown highly viscous liquid material was obtained, having a barium content of 17.9% (theoretical 17.6%), corresponding to the formula:

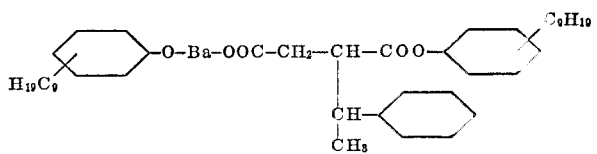

EXAMPLE 16

Barium hydroxide monohydrate, 94.5 g. (0.5 mol), paracyclohexylphenol 176 g. (1.0 mol) and 280 g. mixed isomeric dimethylnaphthalenes were heated and stirred under reduced pressure to dissolve and react the barium hydroxide and distill off the water. Reaction occurred during one hour at 90–130° C. and pressures gradually adjusted as the water came off from 100 mm. at the start to 15 mm. at the end. The product was cooled to 50° C. and 98 g. (1.0 mol) maleic anhydride was added in portions timed to keep the temperature from exceeding 90° C. After all the anhydride was in, heating was continued at 90° C. for a half hour. The mixture was filtered warm to remove a small quantity of solid, and diluted with 140 g. methoxy tripropylene glycol, to give a fluid product analyzing 12.4% Ba(calculated 12.5%) containing the compound:

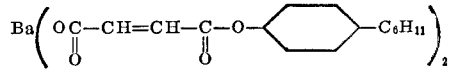

EXAMPLE 17

Barium hydroxide monohydrate 47 g. (0.25 mol), bis(alphamethylbenzyl)phenol 151 g. (0.5 mol), 2-ethyl hexanol 39 g. and xylene 79 g. were heated and shoved under a reflux condenser with a water trap. The expected quantity of water (13.5 g.) was obtained at a final reaction temperature of 147° C. Maleic anhydride 49 g. (0.5 mol) was added to the solution after cooling to 50° C., and allowed to react at 80° C. for one hour. Vacuum was applied to remove 10.5 g. xylene and leave a solution of the desired phenolate ester, that analyzed 10.1% Ba(calculated 10.05% Ba). The compound had the formula:

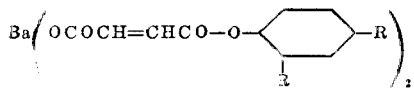

where R =

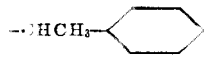

EXAMPLE 18

A compound of the type

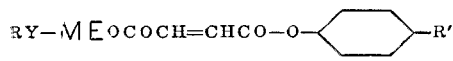

with Y a carboxylic group was prepared by heating and stirring together a mixture of barium hydroxide octahydrate 63 g. (0.2 mol), mixed ortho- and para-cyclohexylphenol 35.2 g. (0.2 mol), oleic acid 56 g. (0.2 mol) and a solvent mixture of mineral spirits 55 g. and 2-phenoxy ethanol 25.8 g. After boiling out the expected quantity of water (18 g.) up to 160° C. pot temperature, the mixture was cooled to 80° C., 19.6 g. (0.2 mol) maleic anhydride added, and allowed to react for one hour. The product was a moderately viscous solution analyzing 12.4% Ba(calculated 12.5% Ba.). The formula was:

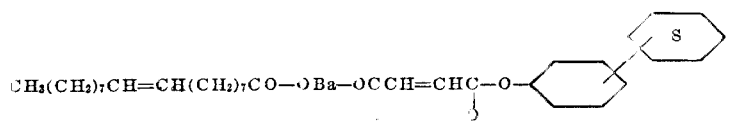

EXAMPLE 19

A mixture of 60.8 g. (0.1 mol) of Ba di(thionoylphenate), 9.8 g. (0.1 mol) of maleic anhydride and 100 g. of toluene was heated to 80° C. over 30 minutes and held at this temperature for one hour. Then the solvent was removed under reduced pressure. The pot residue, a rather viscous liquid material which analyzed 22.2% Ba(calculated 22.4%), had the formula:

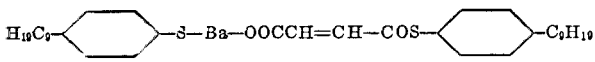

The invention is applicable to any polyvinyl chloride resin. The term "polyvinyl chloride" as used herein is inclusive of any polymer formed at least in part of the recurring group

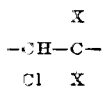

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides such as those disclosed in British Pat. No. 893,288 and also copolymers of vinyl chloride in a major portion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of phenyl phosphite, tri(t-octylphenyl) phosphite, tri(t-nonylphenyl) phosphite, isooctyl di(octylphenyl) phosphite, di(2-ethylhexyl) (isooctyl-phenyl) phosphite, tri(2-cyclohexylphenyl) phosphite, tri-α-naphthyl phosphite, tri(phenylphenyl) phosphite, tri(2-phenyl ethyl) phosphite, tridodecyl thiophosphite, tri-p-tert-butyl phenyl thiophosphite, dodecyl thiodiphenyl phosphite, tert-butyl phenyl thio-di-2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy - 5,5 - dioxaphosphorinane and 2-cyclohexyloxy-5,5-diethyldioxaphosphorinane.

Also useful are the acid phosphites disclosed in U.S. Pat. No. 2,997,454.

As exemplary of these, there are suggested the following: di(phenyl) phosphite, monophenyl phosphite, mono (diphenyl) phosphite, dicresyl phosphite, di-(o-isooctylphenyl) phosphite, di-(p-2-ethylhexyphenyl) phosphite, di(p-t-octylphenyl) phosphite, di(dimethylphenyl) phosphite, di-n-butyl phosphite, di-2-ethylhexyl phosphite, mono-2-ethyl hexyl phosphite, diisooctyl phosphite, monoisooctyl phosphite, mono-dodecyl phosphite, 2-ethylhexyl phenyl phosphite, 2-ethylhexyl-(n-octylphenyl) phosphite, monocyclohexyl phosphite, dicyclohexyl phosphite, di(2-cyclohexyl phenyl) phosphite, di-α-naphthyl phosphite, diphenyl phenyl phosphite, di(diphenyl) phosphite, di-2-phenyl ethyl) phosphite, dibenzyl phosphite, monobenzyl phosphite, n-butyl cresyl phosphite, didodecyl phosphite, ditetrahydrofurfuryl phosphite and difuryl phosphite.

The metal salt stabilizer is a salt of a polyvalent metal and an organic acid having from six to eighteen carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulfur and hydroxyl. The oxygen-containing heterocyclic acids include oxygen and carbon in the ring structure of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, palmitic acid, oleic acid, myristic acid, dodecyl thioether propionic acid

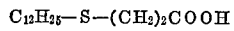

$$C_{12}H_{25}-S-(CH_2)_2COOH$$

hexahydrobenzoic acid, benzoic acid, phenylacetic acid, isobutyl benzoic acid, monoethyl ester of phthalic acid, ethyl benzoic acid, isopropyl benzoic acid, ricinoleic acid, p-t-butylbenzoic acid, n-hexyl benzoic acid, salicylic acid, naphthoic acid, 1-naphthalene acetic acid, orthobenzoyl benzoic acid, naphthenic acids derived from petroleum, abietic acid, dihydroabietic acid, and methyl furoic acid.

Di and higher poly carboxylic acids in which all but one carboxylic acid group are esterified can also be used, such as monoethyl phthalate, monobutyl terephthalate, dipropyl citrate, monobenzyl adipate, and monomethyl pimelate.

The acids are used in the form of their metal salts, particularly the alkaline earth metal salts, such as magnesium, barium, strontium and calcium, and the zinc, cadmium, lead and tin salts. Where these salts are not known, they are made by the usual types of reaction, such as by mixing the acid, acid chloride or anhydride with the corresponding oxide or hydroxide of the metal in a liquid solvent, and heating, if necessary, until salt formation is complete. The barium, cadmium and zinc compounds are preferred.

The alkaline earth metal phenolate esters of the invention are employed in an amount sufficient to impart the desired improvement in resistance to heat deterioration at working temperatures of 350° F. or 375° F. and above. The more rigorous the conditions to which the resin is subjected during working and mixing, and the longer the term required for resistance to degradation, the larger the amount of stabilizer required.

Generally, as little as 0.25% of the alkaline earth metal phenolate ester by weight of the resin imparts some resistance to heat deterioration, and this may be adequate in many cases. There is no critical upper limit on the amount, but amounts above about 10% by weight of the resin do not give an increase in stabilizing effectiveness commensurate with the additional stabilizer employed. Preferably, the amount is from about 0.5 to about 5% by weight of the resin.

If supplemental heat and/or light stabilizers for polyvinyl chloride resins are added in addition to the alkaline earth metal phenolate ester, the amounts employed are sufficient to give a total stabilizer within the range from about 0.25 to about 10% by weight of the resin, and preferably the amount is from about 0.5 to about 5% by weight of the resin.

The alkaline earth metal phenolate ester stabilizers in accordance with the invention can be formulated alone or in combination with other stabilizers as stabilizer compositions for addition to polyvinyl chloride resins by the purchaser. Such stabilizer compositions can be solids or liquids. If solids are desired, where the alkaline earth metal phenolate esters are liquids, sufficient powdered components can be added to the composition to absorb the liquid alkaline earth metal phenolate ester wholly on the solid components. Alternatively, liquid solutions are obtained by incorporating an inert organic solvent for each of the components of the stabilizer composition. Suitable solvents include aliphatic and aromatic hydrocarbons, chlorinated hydrocarbons, and phenols (which also serve as antioxidants), esters, ketones, alcohols, ethers and ether alcohols.

The following examples in the opinion of the inventors represent preferred embodiments of polyvinyl chloride resin compositions containing stabilizer compositions of the invention.

EXAMPLES I TO IV

A plasticized polyvinyl chloride resin formulation was prepared having the following composition:

| Composition: | Parts by weight |
|---|---|
| Polyvinyl chloride resin homopolymer | 100 |
| Dioctyl phthalate | 50 |
| Octyl diphenyl phosphite | 0.5 |
| Cadmium octoate | 0.7 |
| Barium phenolate ester as shown in Table I below | 0.7 |

The ingredients were blended and compounded on a two-roll mill at 135° C. for five minutes, sheeted off, and cut into one inch pieces which were placed in an air oven heated to 175° C.; samples were removed at 15-minute intervals, and attached to cards. The heat stability was reported as the time required for the samples to develop a deep brown or black discoloration. Pressed polished sheets 1 mm. in thickness were prepared, to determine clarity. The plate-out tendency of the composition was also determined, using the Watchung red method.

In this test procedure, a red pigment (1 g. per 100 g. resin) is added to the resin composition. After the composition is sheeted off, the resin plated out on the rolls is picked up on a white resin composition, which is also sheeted off, and the p.p.m. of red pigment in the white sheet is determined by comparison with a set of standard sheets containing known amounts of red pigment. The results (in p.p.m.) are reported.

polyvinyl chloride in a major proportion with other synthetic resins such as chlorinated polyethylene or a copolymer of acrylonitrile, butadiene and styrene. Among the polyvinyl chlorides which can be stabilized are the uniaxially stretch oriented polyvinyl chlorides described in U.S. Pat. No. 2,984,593 to Isaksem et al., that is, syndiotactic polyvinyl chloride, as well as atactic and isotactic polyvinyl chlorides.

The stabilizing combinations of this invention, both with and without supplementary stabilizers, are excellent stabilizers for both plasticized and unplasticized polyvinyl chloride resins. When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, rincinoleyl alcohol, erythritol, mannitol and sorbitol. Glycerol is preferred. These alcohols may be fully partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The stabilizer combinations of this invention are effective in improving clarity of polyvinyl chloride resins in the absence of any other additives. However, it has long been recognized that polyvinyl chloride resins containing several types of heat stabilizers are better protected than those containing only one heat stabilizer. It is therefore an important aspect of this invention that these stabilizer combinations when used with additional heat stabilizers provide greatly improved resistance to heat degradation not obtainable with the other heat stabilizers alone.

Many heat stabilizers are known to the art. Among the more important heat stabilizers in commercial use are mild alkalis such as sodium carbonate, disodium phosphate, and sodium and potassium salts of partially esterified phosphoric acids; inorganic and organic lead salts; organotin carboxylates, as disclosed by Quattlebaum in U.S. Pat. No. 2,307,157; organotin mercaptides as disclosed by Leistner in U.S. Pats. Nos. 2,641,588 and 2,641,596; various metal-free organic compounds such as the polyols, e.g., mannitol, sorbitol, glycerol, pentaerythritol, 1,2-epoxides, e.g., soybean oil epoxide, isooctyl epoxystearate, and the diglycidyl ether of 2,2-bis(p-hydroxyphenyl) propane, and nitrogen compounds, e.g., phenylurea, N,N'-diphenyl-thiourea, and 2-phenylindole. For detailed discussion of heat stabilizers for vinyl halide resins, reference may be made to the articles by N. L. Perry "Barium-Cadmium Stabilization of Polyvinyl Chloride," Rubber Age 85, 449–452 (June 1959) and by H. Verity-Smith, British Plastics 27, 176–179, 213–217, 307–311 (1954), the brochure by the same author, "The Development of the Organotin Stabilizer" (Tin Research Institute, 1959), and the book, "La Stabilization des Chlorures de Polyvinyle," by F. Chevassus (Amphora, Paris, 1957).

Preferred classes of additional heat stabilizers which can be used include the organic phosphites and polyvalent metal salts of non-nitrogenous organic carboxylic acids.

The triphosphite can be any organic triphosphite having attached to phosphorus through oxygen or sulfur groups selected from aryl, alkyl, cycloalkyl, aralkyl and alkaryl groups, in any combinations, such as, three monovalent groups (RA)₃P; one monovalent group and one bivalent group, forming a heterocyclic ring with the phosphorus,

a plurality of bivalent groups forming polymers therewith.

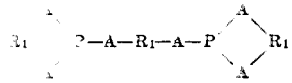

one trivalent group,

and a plurality of trivalent groups forming polymers therewith.

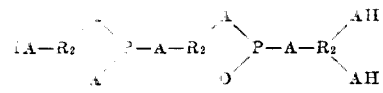

and any combinations of monovalent, bivalent and trivalent groups to form monomeric and polymeric phosphites; wherein A is oxygen or sulfur. The term "organic phosphite triester" as used herein is inclusive of oxo, thio and mixed oxo thio phosphites. Usually, the phosphite will not have more than about sixty carbon atoms.

Exemplary are monophenyl di-2-ethyl hexyl phosphite, diphenyl mono-2-ethyl hexyl phosphite, diisooctyl monotolyl phosphite, tri-2-ethyl hexyl phosphite, phenyl dicyclohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl The results obtained are shown in Table I.

TABLE I

| Example No. | Ba phenolate ester of example No.— | Ba phenolate | Heat stability, min. | Clarity | Plate-out |
|---|---|---|---|---|---|
| I | 1 | $Ba(OOCCH=CHCOO-\langle\bigcirc\rangle)_2$ | 110 | A little superior | 70 |
| II | 2 | $Ba(OOCCH=CHCOO-\langle\bigcirc\rangle-C_9H_{19})_2$ | 120 | Superior | 15 |
| III | 3 | $Ba(OOCCH=CHCOO-\langle\bigcirc\rangle-C(CH_3)_3)_2$ | 110 | do | 45 |
| IV | 4 | $Ba(OOCCH=CHCOO-\langle\bigcirc\rangle-C_8H_{17})_2$ | 120 | do | 50 |
| Control | | $Ba(O-\langle\bigcirc\rangle-C_8H_{17})_2$ | 110 | Standard | 260 |

It is apparent from the above results that besides improving heat stability, this stabilizer formulation imparted good clarity, and was not afflicted by plate-out. In addition, no excessive blooming was noted after three months storage.

The above-described examples were repeated, substituting for the phenolate ester shown in Examples 1 to 4 the precursor mixture of phenolate and anhydride shown in Examples 1 to 4 in the same proportions to produce the ester. The results obtained were equivalent, showing that the ester and the precursor mixture are equivalent, and that the ester may be formed in situ from the precursor mixture during blending with and processing of the resin.

EXAMPLE V

A stabilizer composition was prepared, based on the barium phenolate maleate of Example 14, and having the following composition:

| Composition: | Parts by weight |
|---|---|
| Ba(nonyl phenylmaleate) nonylphenolate (11.3% Ba) | 37.3 |
| Ba nonylphenolate (12.3% Ba) | 8.6 |
| Cd 2-ethyl hexoate (14% Cd) | 10.0 |
| Zn 2-ethyl hexoate (8.5% Zn) | 3.0 |
| 2-ethyl hexyl diphenyl phosphite | 22.0 |
| Diphenyl phosphite | 1.3 |
| Mineral spirits | 17.8 |
| Total | 100.0 |

This composition gives good heat stability and excellent clarity, as well as good initial color and minimum plate-out. This is illustrated by the following:

A polyvinyl chloride resin formulation was prepared having the following composition:

| Composition: | Parts by weight |
|---|---|
| Polyvinyl chloride resin homopolymer (Diamond 450) | 100 |
| Dioctyl phthalate | 50 |
| Isooctyl epoxy stearate | 5.0 |
| Stearic acid | 0.5 |
| Stabilizer composition noted above | 2.0 |

This composition was compared to another composition using barium nonylphenolate as the stabilizer, as a control; and prepared in the same way.

The ingredients were blended and compounded on a two-roll mill at 135° C. for five minutes, sheeted off, and cut into one inch pieces. The pieces were placed in an air oven heated at 175 and 190° C., and samples were removed at 15-minute intervals and attached to cards. The heat stability was noted as the time required for the samples to turn a dark brown or black color. Plate-out was determined in accordance with the Watchung red method. The following results were obtained.

TABLE II.—HEAT STABILITY

| | 175° C. | | 190° C. | |
|---|---|---|---|---|
| Stabilizer | Example V | Control Ba nonyl phenolate | Example V | Control, Ba nonyl phenolate |
| Time: | | | | |
| 0 | Clear, colorless | Clear, colorless | Clear, colorless | Clear, colorless. |
| 15 | do | Very pale yellow | do | Very pale yellow. |
| 30 | Very pale yellow | Pale yellow | Very pale yellow | Pale yellow. |
| 45 | do | do | Pale yellow | Yellow. |
| 60 | do | Yellow | Yellow | Yellow, corner failure. |
| 75 | do | do | do | Yellow, edge failure. |
| 90 | do | do | Dark yellow, corner failure | Dark yellow, edge failure. |
| 105 | Pale yellow | do | Dark yellow, edge failure | Dark yellow, severe edge failure. |
| 120 | Yellow | do | Dark yellow, severe edge failure | Do. |

See the following table:

| Stabilizer | Plate-out, p.p.m. |
|---|---|
| Example V | 50 |
| Ba nonyl phenolate | 100 |

The results show Example V clearly superior. The superiority is also evident in the plate-out test.

EXAMPLE VI

A stabilizer formulation was prepared having the following composition:

| Composition: | Parts by weight |
|---|---|
| Cd 2-ethyl hexoate (14% Cd) | 99 |
| Ba(nonylphenylmaleate) nonylphenolate (Example 14) | 533 |
| 2-ethylhexyl diphenyl phosphite | 354 |
| Diphenyl phosphite | 14 |
| Total | 1000 |

This stabilizer formulation gives good initial color and has low plate-out, as well as a good heat stabilizing effectiveness.

The stabilizer composition was formulated as a polyvinyl chloride resin composition according to the following composition:

| Composition: | Parts by weight |
|---|---|
| Polyvinyl chloride resin homopolymer (Geon 103 Ep) | 100 |
| Dioctyl phthalate | 50 |
| Cd stearate | 0.3 |
| Ba stearate | 0.2 |
| Stabilizer composition noted above | 2.0 |

The ingredients were blended and compounded on a two-roll mill at 135° C. for five minutes, sheeted off, and cut into one inch pieces. The pieces were placed in an air oven heated to 190° C., and samples removed at 15-minute intervals and attached to cards. The appearance of the samples on the cards was noted, and the heat stability recorded as the time required for the samples to become dark brown. Pressed polished sheets were prepared to determine clarity. Blooming was also noted, and plate-out according to the Watchung red test. The following results were obtained:

TABLE III

| Heat stability (brown) 190C. | Initial color | Clarity | Blooming | Plate-out value |
|---|---|---|---|---|
| 90 min | Slight | Good | Very slight | 125 |

EXAMPLE VII

A stabilizer formulation was prepared according to the following composition:

| Composition: | Parts by weight |
|---|---|
| Ba(nonyl phenylmaleate) nonylphenolate (Ex. 14) | 19 |
| Ba-nonylphenolate (12.3% Ba) | 20 |
| Cd tert butylbenzoate (13% Cd) | 19 |
| Didecyl phenyl phosphite | 33.5 |
| Diphenyl phosphite | 8.5 |
| Total | 80 |

This composition gives excellent clarity, no initial color, and good heat stability to polyvinyl chloride resin compositions, and the plate-out properties are good, while blooming is small. This is shown by the following experiment:

A plasticized polyvinyl chloride resin composition containing this stabilizer was prepared according to the following formulation:

| Composition: | Parts by weight |
|---|---|
| Polyvinyl chloride homopolymer (Geon 103 Ep) | 100 |
| Dioctyl phthalate | 48 |
| Epoxidized soya bean oil | 2 |
| Cadmium stearate | 0.3 |
| Barium stearate | 0.2 |
| Stabilizer | 1.5 |

The ingredients were blended and compounded in a two-roll mill at 135° C. for five minutes, sheeted off, and cut into one inch pieces. The pieces were placed in an air oven heated to 190° C., and samples removed at 15-minute intervals and attached to cards. The appearance of the samples on the cards was noted, and the time required for the samples to become brown is noted as the heat stability. Initial color was also observed. The clarity was determined in pressed polished sheets, and plate-out was determined according to the Watchung red test. The following results were obtained:

TABLE IV

| Heat stability (brown) 190° C. | Initial color | Clarity | Blooming | Plate-out value |
|---|---|---|---|---|
| 120 min | None | Excellent | Very slight | 30 |

EXAMPLE VIII

The barium phenolate ester of Example 15 gives excellent clarity and no initial color to polyvinyl chloride resin compositions when combined with cadmium and zinc salts and organic phosphites. This is shown by the following.

A polyvinyl chloride resin composition was prepared having the following formulation:

| Composition: | Parts by weight |
|---|---|
| Polyvinyl chloride resin homopolymer (Geon 103 Ep) | 100 |
| Dioctyl phthalate | 50 |
| Barium nonylphenyl ethylbenzene succinate nonyl phenolate (Ex.) 15 | 0.8 |
| Cadmium 2-ethylhexoate (100% basis) | 0.4 |
| 2-ethylhexyl diphenyl phosphite | 0.7 |

The ingredients were blended and compounded on a two-roll mill at 135° C. for five minutes, sheeted off and cut into one inch pieces. The pieces were placed in an air oven heated to 175° C., and samples removed at 15 minute intervals and attached to cards. The appearance of the samples on the cards was noted, and the time required for the samples to develop a deep brown discoloration was determined as the heat stability. Initial color was noted. Clarity was determined by way of pressed polished sheets. The plate-out was determined by the Watchung red test, and weathering resistance was also determined as the hours required for the sample to deteriorate.

The following results were obtained:

TABLE V

| Heat stability (brown) 175° C. | Initial color | Clarity | Weathering resist. (hrs.) | Plate-out value |
|---|---|---|---|---|
| 120 min | None | Excellent | 1,000 | 300 |

EXAMPLE IX

A polyvinyl chloride resin composition was prepared having the following formulation:

| Composition: | Parts by weight |
|---|---|
| Polyvinyl chloride resin homopolymer (Geon 103 Ep) | 100 |
| Dioctyl phthalate | 50 |
| Barium nonylphenyl ethylbenzene-succinate nonyl phenolate of Example 15 | 0.8 |
| Cadmium monobutyl ethylbenzene-succinate | 0.67 |
| 2-ethylhexyl diphenyl phosphite | 0.7 |

The ingredients were blended and compounded on a two-roll mil at 135° C. for five minutes, sheeted off and cut into one inch pieces. The pieces were placed in an air oven heated to 175° C., and samples removed at 15-minute intervals and attached to cards. The appearance of the samples on the cards was noted, and the time required for the samples to develop a deep brown discoloration was determined as the heat stability. Initial color was also noted. Clarity was determined by way of pressed polished sheets. The plate-out was determined by the Watchung red test, and weathering resistance was also determined as the hours required for the sample to deteriorate.

The following results were obtained:

TABLE VI

| Heat stability (brown) 175° C. | Initial color | Clarity | Weathering resist. (hrs.) | Plate-out value |
|---|---|---|---|---|
| 105 min. | Slight | Excellent | 1,000 | 15 |

EXAMPLE X

A polyvinyl chloride resin composition was prepared having the following formulation:

| Composition: | Parts by weight |
|---|---|
| Polyvinyl chloride resin homopolymer (Geon 103 Ep) | 100 |
| Dioctyl phthalate | 50 |
| Barium nonylphenyl ethylbenzene-succinate nonyl phenolate | 0.8 |
| Cadmium t-butylbenzoate (100% basis) | 0.5 |
| Didecyl phenyl phosphite | 0.875 |

The ingredients were blended and compounded on a two-roll mill at 135° C. for five minutes, sheeted off and cut into one inch pieces. The pieces were placed in an air oven heated to 175° C., and samples removed at 15-minute intervals and attached to cards. The appearance of the samples on the cards was noted, and the time required for the samples to develop a deep brown discoloration was determined as the heat stability. Initial color was also noted. Clarity was determined by way of pressed polished sheets. The plate-out was determined by the Watchung red test, and weathering resistance was also determined as the hours required for the sample to deteriorate.

The following results were obtained:

TABLE VII

| Heat stability (brown) 175° C. | Initial color | Clarity | Weathering resist. (hrs.) | Plate-out value |
|---|---|---|---|---|
| 120 min. | None | Good | 1,200 | 50 |

EXAMPLE XI

A stabilizer formulation was prepared having the following composition:

| Composition: | Parts by weight |
|---|---|
| Cadmium 2-ethylhexoate (14% Cd) | 99 |
| Ba(nonyl thiophenylmaleate)nonyl thiophenolate (Ex. 19) | 533 |
| 2-ethylhexyl diphenyl phosphite | 354 |
| Diphenyl phosphite | 14 |
| Total | 1000 |

This stabilizer formulation gives good initial color and has low plate-out, as well as a good heat stabilizing effectiveness.

The stabilizer composition was formulated as a polyvinyl chloride resin composition according to the following composition:

| Composition: | Parts by weight |
|---|---|
| Polyvinyl chloride resin homopolymer (Geon 103 Ep) | 100 |
| Dioctyl phthalate | 50 |
| Cd stearate | 0.3 |
| Ba stearate | 0.2 |
| Stabilizer composition noted above | 2.0 |

The ingredients were blended and compounded on a two-roll mill at 135° C. for five minutes, sheeted off, and cut into one inch pieces. The pieces were placed in an air oven, heated to 190° C., and samples removed at 15 minute intervals and attached to cards. The appearance of the samples on the cards was noted, and the heat stability recorded as the time required for the samples to become dark brown. Pressed polished sheets were prepared to determine clarity. Blooming was also noted, and plate-out according to the Watchung red test. The following results were obtained:

TABLE VIII

| Heat stability (brown) 190° C. | Initial color | Clarity | Blooming | Plate-out value |
|---|---|---|---|---|
| 90 min. | Slight | Good | Very slight | 125 |

Having regard to the foregoing disclosure, the following is claimed as the inventive and patentable embodiments thereof:

1. A polyvinyl chloride resin heat stabilizer combination comprising an alkaline earth metal phenoxide ester having the formula:

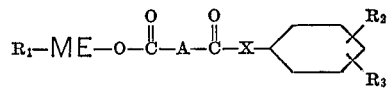

wherein
—$R_1$ is selected from the group consisting of:

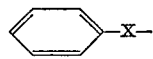

wherein the phenyl radical may be alkyl substituted;

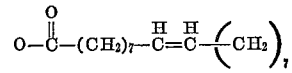

—$CH_3$;
and another

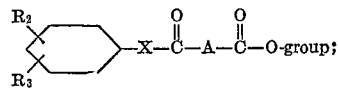

X is oxygen or sulfur;
A is a bivalent hydrocarbon group having from two to about twelve carbon atoms, and
$R_2$ and $R_3$ are selected from the group consisting of hydrogen, $R_1$ phenyl and alkyl-substituted phenyl having from one to about twelve carbon atoms, and an additional polyvinyl chloride resin heat stabilizer.

2. A polyvinyl chloride resin heat stabilizer combination according to claim 1, in which the additional heat stabilizer is selected from organic phosphites and polyvalent metal salts of non-nitrogenous organic carboxylic acids.

3. A polyvinyl chloride resin heat stabilizer combination according to claim 2, in which the organic phosphite has attached to phosphorus through oxygen or sulfur from one to three groups selected from aryl, alkyl, cycloalkyl, aralkyl and alkaryl groups.

4. A polyvinyl chloride resin heat stabilizer combination according to claim 2, wherein the polyvalent metal salt stabilizer is of a monocarboxylic acid having from six to eighteen carbon atoms, selected from aliphatic, aromatic, alicyclic and oxygen-containing heterocyclic monocarboxylic acids.

5. A polyvinyl chloride resin heat stabilizer combination in accordance with claim 1 in which $R_1$ is alkyl phenyl.

6. A polyvinyl chloride resin heat stabilizer combination in accordance with claim 1 in which $R_1$ is linked to the alkaline earth metal atom ME through another

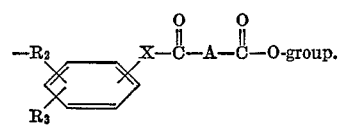

7. A polyvinyl chloride resin heat stabilizer combination according to claim 1 in which the alkaline earth metal is barium.

8. A polyvinyl chloride resin heat stabilizer combination according to claim 1 in which A is ethylene

—CH=CH—

9. A polyvinyl chloride resin heat stabilizer combination according to claim 1 in which the alkaline earth metal phenoxide ester is barium mono(maleate) mono(alkyl phenolate).

10. A polyvinyl chloride resin heat stabilizer combination according to claim 1 in which the alkaline earth metal phenoxide ester is barium mono(alkyl phenyl succinate) mono(alkyl phenolate).

11. A polyvinyl chloride resin composition having improved resistance to weathering, and a reduced tendency to plate out, and to develop bloom, comprising an alkaline earth metal phenoxide ester having the formula:

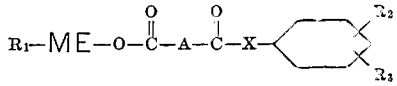

wherein
—$R_1$ is selected from the group consisting of:

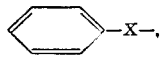

wherein the phenyl radical may be alkyl substituted;

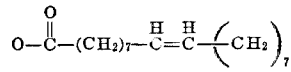

—$CH_3$;
and another

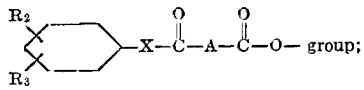

X is oxygen or sulfur;
A is a bivalent hydrogen group having from two to about twelve carbon atoms; and
$R_2$ and $R_3$ are selected from the group consisting of hydrogen $R_1$ alkyl and alkyl-substituted phenyl having from one to about twelve carbon atoms, and a polyvinyl chloride resin.

12. A polyvinyl chloride resin composition according to claim 11, comprising an additional polyvinyl chloride resin heat stabilizer.

13. A polyvinyl chloride resin composition according to claim 11, comprising a plasticizer.

14. A polyvinyl chloride resin composition according to claim 13, comprising an epoxy plasticizer.

15. A polyvinyl chloride resin composition according to claim 11, wherein the polyvinyl chloride resin is polyvinyl chloride resin homopolymer.

16. A polyvinyl chloride resin composition in accordance with claim 11 in which $R_1$ is alkyl phenyl.

17. A polyvinyl chloride resin composition in accordance with claim 11 in which $R_1$ is linked to the alkaline earth metal atom ME through another

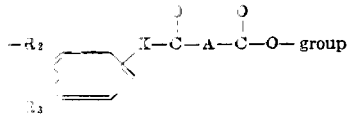

18. A polyvinyl chloride resin composition in accordance with claim 11 in which the alkaline earth metal is barium.

19. A polyvinyl chloride resin composition in accordance with claim 11 in which A is ethylene —CH=CH—.

20. A polyvinyl chloride resin composition in accordance with claim 11 in which the alkaline earth metal phenoxide ester is barium mono(maleate) mono(alkyl phenolate).

21. A polyvinyl chloride resin composition in accordance with claim 11 in which the alkaline earth metal phenoxide ester is barium mono(alkyl phenyl succinate) mono(alkyl phenolate).

References Cited
UNITED STATES PATENTS

| | | | |
|---|---|---|---|
| 3,202,622 | 8/1965 | Scullin | 260—23 |
| 2,394,417 | 2/1946 | Yngue | 260—45.85 |
| 2,394,418 | 2/1946 | Quattlebaum et al. | 260—45.85 |
| 2,307,157 | 1/1943 | Quattlebaum et al. | 260—45.75 |
| 2,313,757 | 3/1943 | Matheson et al. | 260—45.85 |
| 3,347,823 | 10/1967 | Buckley et al. | 260—45.85 |
| 2,795,570 | 6/1957 | Fuchs et al. | 260—45.75 |
| 3,376,256 | 4/1968 | Klemchuk | 260—45.85 |
| 3,180,848 | 4/1965 | Thompson | 260—45.85 |
| 2,310,449 | 2/1943 | Lightbown | 260—45.75 |

DONALD E. CZAJA, Primary Examiner
V. P. HOKE, Assistant Examiner

U.S. Cl. X.R.

252—406; 407; 260—23 XA, 30.4 R, 45.7 R, 45.7 P, 45.7 PS, 45.8 A, 45.8 R, 45.85 E, 45.85 H, 45.85 T, 45.85 V, 45.95 J, 45.9 R, 469, 470, 475 SC, 476 R, 455 C